United States Patent [19]

Nobusue et al.

[11] Patent Number: 4,945,635
[45] Date of Patent: Aug. 7, 1990

[54] METHOD OF MANUFACTURING BRAZABLE PIPES AND HEAT EXCHANGER

[75] Inventors: Mitsuru Nobusue; Noboru Kodachi, both of Oyamashi, Japan

[73] Assignee: Showa Alumina Kabushiki Kaisha, Osaka, Japan

[21] Appl. No.: 358,708

[22] Filed: May 30, 1989

[30] Foreign Application Priority Data

Jul. 14, 1988 [JP] Japan .................................. 63-176095

[51] Int. Cl.⁵ .................................. B21D 53/02
[52] U.S. Cl. ........................ 29/890.043; 29/890.046; 29/890.053; 29/890.054; 165/173; 228/183
[58] Field of Search ............ 29/157.3 R, 157.4; 228/183, 146, 161, 171; 165/173; 72/51

[56] References Cited

U.S. PATENT DOCUMENTS

| 1,540,270 | 6/1925 | May ..................................... 29/157.4 |
| 2,105,241 | 1/1938 | Gazey ................................... 29/157.4 |
| 3,546,763 | 12/1970 | Pasternak ........................... 29/157.3 |
| 3,683,657 | 8/1972 | Davies ................................ 29/157.4 |
| 4,678,112 | 7/1987 | Koisuka et al. ...................... 228/183 |
| 4,680,845 | 7/1987 | Miller ................................. 29/157.4 |
| 4,749,033 | 6/1988 | Clausen ............................. 29/157.4 |

FOREIGN PATENT DOCUMENTS

| 879419 | 8/1971 | Canada ............................... 29/157.4 |
| 1018680 | 9/1952 | Fed. Rep. of Germany ..... 29/157.4 |
| 0141906 | 5/1980 | Fed. Rep. of Germany .......... 72/51 |
| 0130419 | 7/1985 | Japan .................................... 72/51 |

Primary Examiner—Howard N. Goldberg
Assistant Examiner—Irene Cuda

[57] ABSTRACT

A process for producing brazeable pipes particularly for use in heat exchangers, the process comprising preparing a brazing sheet which comprises a core sheet coated with a brazing substance at least on one surface, forming a bulged portion of a semi-circular cross-section in the central section of the brazing sheet, providing apertures in the bulged portion for securing tube ends therein, and rolling the brazing sheet into a cylinder with its opposite ends being butt jointed to each other.

8 Claims, 6 Drawing Sheets

METHOD OF MANUFACTURING BRAZABLE PIPES AND HEAT EXCHANGER

BACKGROUND OF THE INVENTION

The present invention relates to the production of brazeable pipes particularly for use as headers in condensers, evaporators, and radiators in automobile air conditioning systems.

A heat exchanger includes cylindrical headers which introduce a cooling medium into the tubes and discharge it after it has circulated throughout the tubes. The cylindrical headers, hereinafter referred to as header pipes, are made by rolling a brazing sheet into a cylinder. The brazing sheet is made of a core sheet coated with a brazing substance on one or both surfaces. The headers, the tubes and other components such as fins are brazed to one another at vacuum or with the use of flux.

So far the header pipes have been produced in the following manner:

The brazing sheet is prepared and rolled until its both ends are butted. The butted ends are electrically welded to form a seamed pipe. Then a given number of holes are made in the header pipe for allowing the connection of tubes therein.

To make the holes a punching pressure is applied to the header pipes, but under the pressure the pipes are in danger of crushing or deforming because of the relatively weak welded seams. To avoid such problems, the holes are made by a milling. The milling unavoidably produces flashes, so that the trimming of flashes is required. This is a time- and a labor-consuming work. In order to keep the header pipes tough the holes must be off the welded seam. It is required to ascertain whether or not the spot to be holed is off the welded seam.

Accordingly an object of the present invention is to provide a process for producing breazeable pipes particularly for use as header pipes without the possibility of crush and deformation.

Another object of the present invention is to provide a process for producing breazeable pipes which enables easy removal of flashes possibly caused in milling the holes.

A further object of the present invention is to provide a process for producing breazeable pipes having holes produced off the seam.

Other objects and advantages of the present invention will become more apparent from the following detailed description, when taken in conjunction with the accompanying drawings which show, for the purpose of illustration only, one embodiment in accordance with the present invention.

SUMMARY OF THE INVENTION

These objects of the present invention is achieved by providing a process for producing breazeable pipes particularly for use in heat exchangers, the process comprising preparing a brazing sheet which comprises a core sheet coated with a brazing substance at least on one surface, forming a bulged portion of a sem-circular cross-section in the central section of the brazing sheet, providing apertures in the bulged portion for insertion of the ends of the tubes, and rolling the brazing sheet into a cylinder with its opposite ends being butt jointed to each other.

DETAILED DESCRIPTION OF THE PREFERRED EMBODIMENTS

Figure 1:
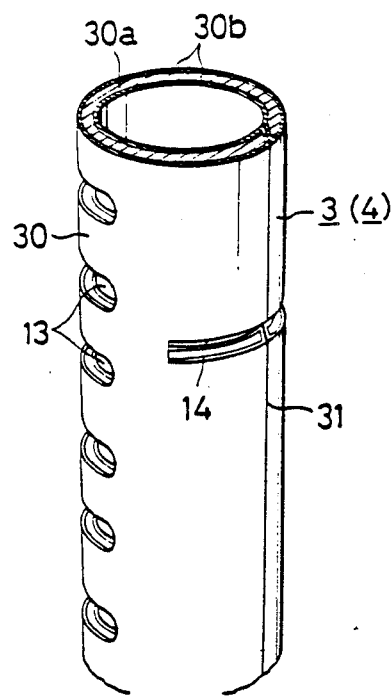
FIG. 1 is a perspective view showing a header pipe produced according to the present invention.
Figure 2:
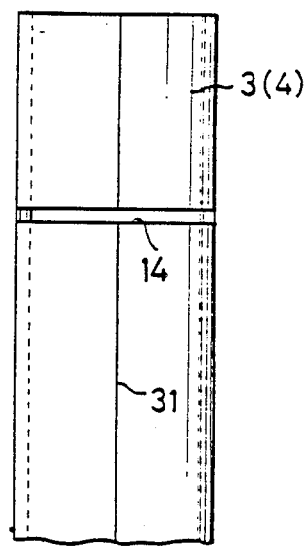
FIG. 2 is a front view showing the header pipe.
Figure 3:
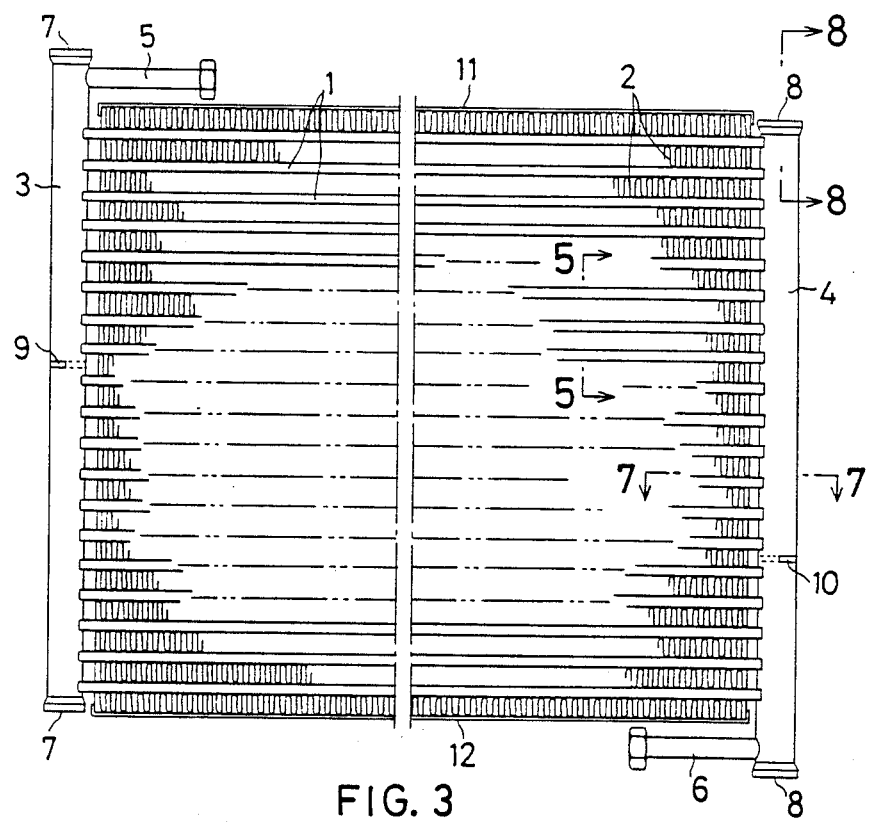
FIG. 3 is a front view showing a heat exchanger incorporating the header pipe of FIG. 1 and tubes connected thereto.
Figure 4:
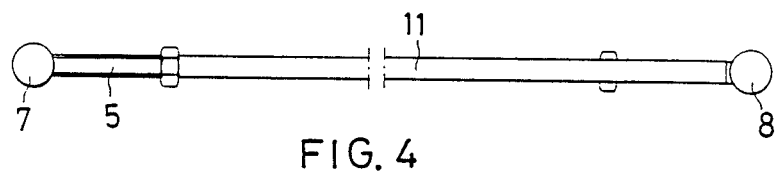
FIG. 4 is a plan view of the heat exchanger of FIG. 3.
Figure 5:
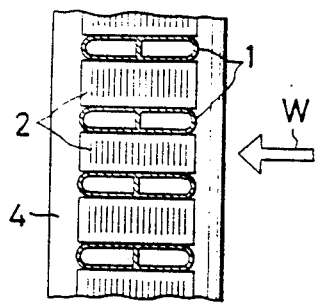
FIG. 5 is a cross-sectional view on an enlarged scale taken along the line 5—5 in FIG. 3.
Figure 6:
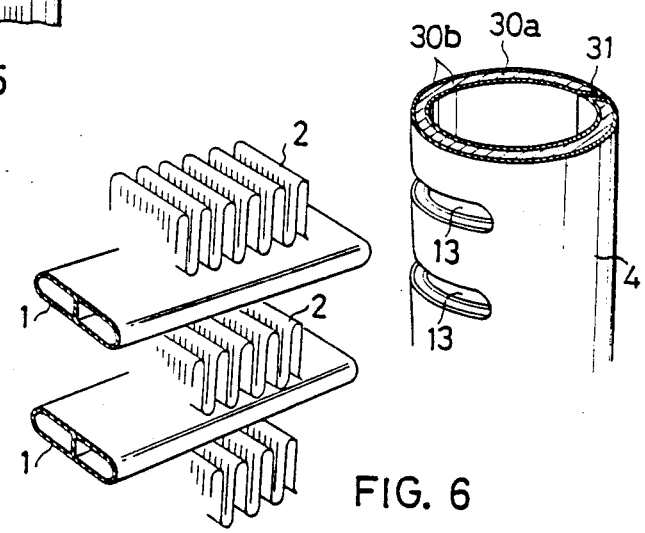
FIG. 6 is an exploded perspective view showing the header pipe, the tubes and corrugated fins.

The illustrated embodiment is applicable to header pipes used in aluminum heat exchangers as condensers for automobile air conditioning systems. Herein the aluminum includes aluminum-base alloy, and the "circular" includes elliptic.

Referring to FIGS. 3 to 7, the heat exchanger has a plurality of flat tubes 1 stacked one above another, corrugated fins 2 sandwiched between the tubes 1, and header pipes 3, 4 connected to the ends of the tubes 1 such that cooling medium paths are formed in zigzag patterns through the header pipes 3, 4 and the tubes 1. The tubes 1 are made of aluminum extrusion. Alternatively they can be made of multi-bored pipes, commonly called "harmonica" tubes. The bores provide coolant medium paths. Or else, they can be made of electrically seamed pipes. The corrugated fins 2 have the same width as that of the tubes 1 and are brazed thereto. The corrugated fins are also made of aluminum, and preferably provided with louvers on their surfaces.

The header pipes 3, 4 are made in the following manner:

Referring to FIGS. 3 to 7, a brazing sheet 30 is prepared by coating an aluminum core sheet 30a with a brazing substance to form a layer 30b. The brazing substance is aluminum-silicone alloy containing about 6.0% to 13% Si. In this specification the percentage is represented in terms of weight unless specified to the contrary.

Figure 11:
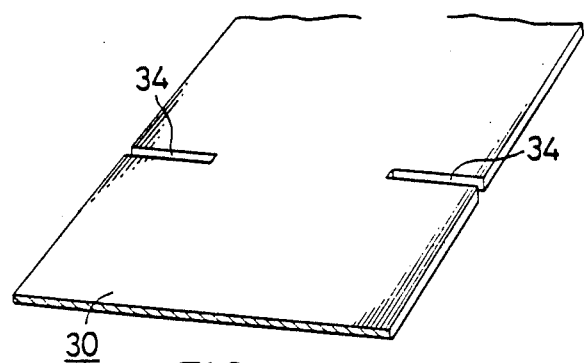
FIG. 11 is a perspective view showing the brazing sheet of FIG. 9 which is provided with slits at opposite sides for insertion of partitions.

As shown in FIG. 11, the brazing sheet 30 is provided with a desired number of slits 34 at opposite sides, wherein the pair of slits 34 are symmetrical with respect to the lengthwise axis. Each pair of opposite slits 34 consititute a slit 14 for receiving the partitions 9 and 10 when the brazing sheet 30 is rolled into the header pipe 3, 4.

Figure 7:
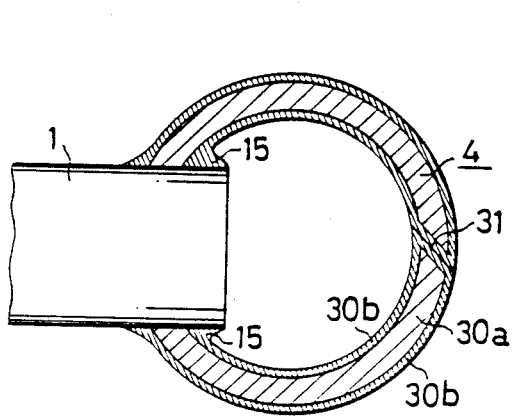
FIG. 7 is a cross-sectional view on an enlarged scale taken along the line 7—7 of FIG. 3.
Figure 12:
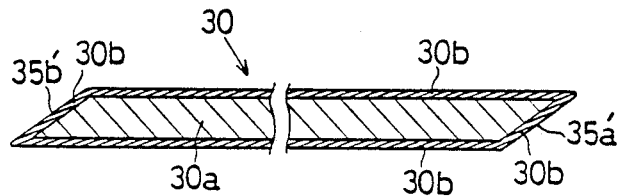
FIG. 12 is a cross-sectional view on an enlarged scale showing the brazing sheet of FIG. 9 whose ends become slanted.
Figure 13:
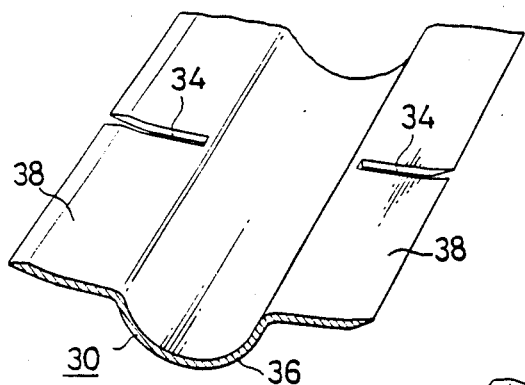
FIG. 13 is a perspective cross-sectional view on an enlarged scale showing the brazing sheet of FIG. 12 having a bulged portion.
Figure 14:
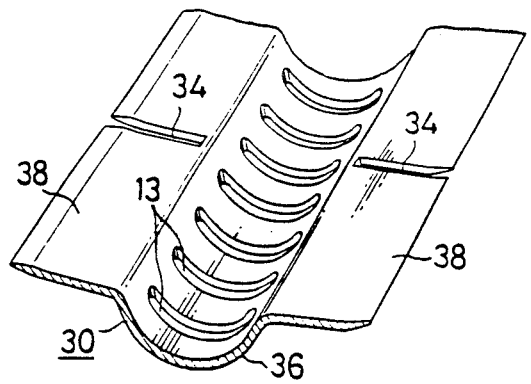
FIG. 14 is a perspective cross-sectional view on an enlarged scale showing the brazing sheet of FIG. 13 whose bulged portion has slits for insertion of the tubes.

Referring to FIG. 12, each end of the brazing sheet 30 is slanted at 35a', 35b' which are also covered with the brazing layer 30b. As shown in FIG. 7, the opposite slanted ends 35a' and 35b' are butted and brazed, thereby forming a seam 31 therebetween. The advantage of the slanted ends 35a' and 35b' is that their contact area becomes larger than when both ends have straight faces, thereby securing the liquidtight joint.

After the slits 34 are made in the brazing sheet 30, the central portion thereof is lengthwise pressed so as to give a bulged portion 36 and two horizontal portions 38 shaped like wings, hereinafer referred to as wing portions. The bulged portion 36 has a semi-circular cross-section.

Then the brazing sheet 30 is provided with apertures 13 produced by means of a punching die and mold. The apertures 13 receive the tubes 1. By being backed up by the mold the bulged portion 36 is prevented from becoming crushed or deformed, thereby producing the apertures 13 at required places to a precise dimension. Instead of the press a milling can be used. Flashes, if any, can be trimmed from the inner side of the bulged portion 36.

Figure 15:
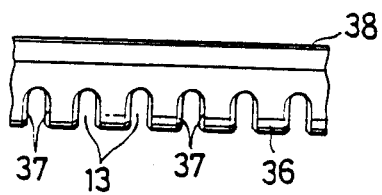
FIG. 15 is a side view on an enlarged scale showing chamfered edges of the slits shown in FIG. 14.

Preferably, each aperture 13 chamfered so as to allow the smooth insertion of the tube 1. In FIG. 15 the reference numeral 37 denotes chamfered edges.

Figure 16:
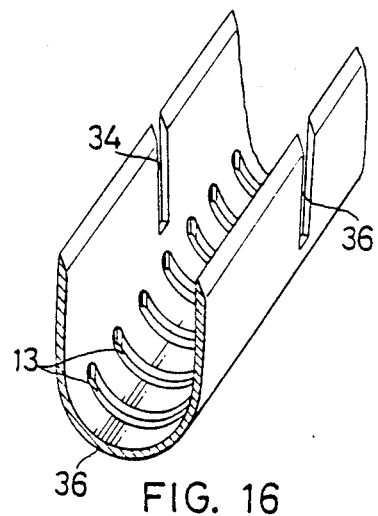
FIG. 16 is a perspective view showing the brazing sheet of FIG. 14 which is bent in U-shape.

When necessary, the surface of the brazing sheet 30 is flattened. Then the wing portions 38 are straightened as shown in FIG. 16 until the whole configuration has a U-shape cross-section. Finally the U-shape brazing sheet 30 is rolled into a cylinder in which the slanted ends 35a', 35b' are butted complementarily to the thickness of the brazing sheet 30 shown in FIG. 7. The butted ends 35a', 35b' of the brazing sheet 30 are brazed to each other in a brazing furnace at the same time when the headers, the tubes and the fins are brazed together.

In constructing a heat exchanger the ends of the tubes 1 are inserted into the apertures 13 of the header pipes 3, 4 as shown in FIG. 7. The corrugated fins 2 are sandwiched between the tubes 1, and the partitions 9, 10 are inserted into the slits 14 of the header pipes 3, 4. The outermost fins are respectively provided with the side plates 11, 12. The tubes 1, the fins 2, the header pipes 3, 4, the partitions 9, 10, the side plates 11, 12 and the the inlet pipe 5, and the outlet pipe 6 are provisionally assembled, and placed in a brazing furnace. In this way the mass brazing is effected. Preferably, the fins 2 are also made of brazing sheets, that is, a core sheet coated with a brazing substance, so that the fins 2 can be joined to the tubes 1. As shown in FIG. 7, tube 1 is liquid-tightly jointed to the header pipe 3, 4 with fillets 15. The ends 35a', 35b' of the brazing sheet 30 are butted complementary to the thickness of the brazing sheet 30, wherein the seams 31 are flush with the wall surfaces of the header pipes 3, 4.

Figure 8:
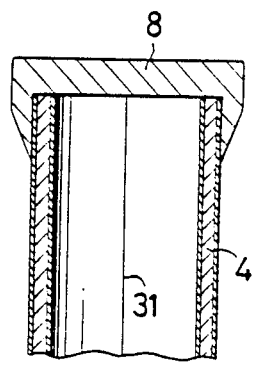
FIG. 8 is a cross-sectional view on an enlarged scale taken along the line 8—8 of FIG. 3.
Figure 9:
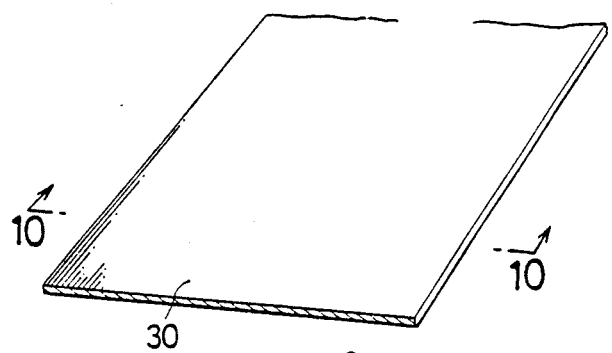
FIG. 9 is a perspective view showing a brazing sheet used for making the header pipe of FIG. 1.
Figure 10:
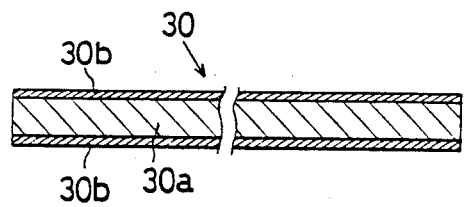
FIG. 10 is is a cross-sectional view on an enlarged scale taken along the line 10—10 of FIG. 9.

The open ends of the headers 3, 4 are covered with the caps 7, 8. As shown in FIG. 8, each cap 7, 8 has a relatively thick bottom and a tapered side wall. The tapered side wall becomes progressively thin so that the terminating edge of the cap keeps contact with the wall surface of the header pipe without steps therebetween. The cap 7, 8 is also effective to prevent the header pipe 3, 4 from expanding or deforming by heat involved in the brazing operation. When the hear exchanger is used as a condenser, the caps 7, 8 are effective to prevent the header pipes 3, 4 from exploding owing to the build-up of internal pressure.

Figure 17:
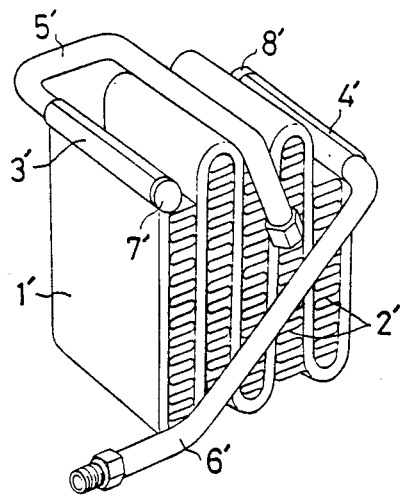
FIG. 17 is a perspective cross-sectional view a heat exchanger incorporating a modified header pipe.
Figure 18:
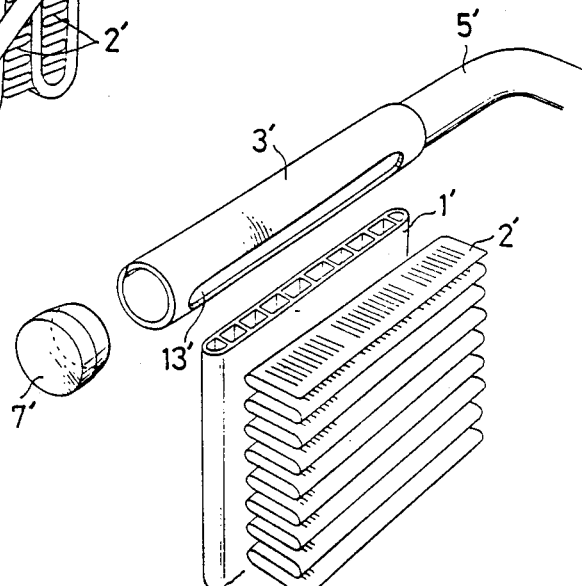
FIG. 18 is a perspective view showing the heat exchanger of FIG. 17 in which the header and the tubes are separated.
Figure 19:
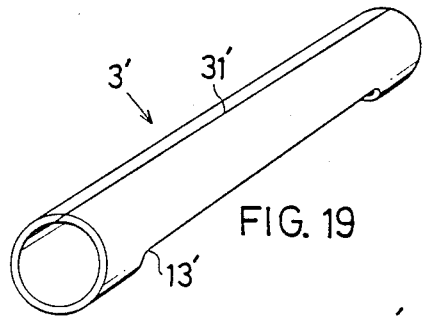
FIG. 19 is a perspective view on an enlarge scale showing the header pipe of FIG. 18.

FIG. 17 and 18 show a heat exchanger used as a heat exchanger for automobile air conditioning system. The heat exchanger incorporates header pipes 3, 4 produced under the present invention. The heat exchanger comprises a multi-bored tube 1', corrugated fins 2' sandwiched between the walls of the tube 1', an inlet header pipe 3' and an outlet header pipe 4'.

Figure 20:
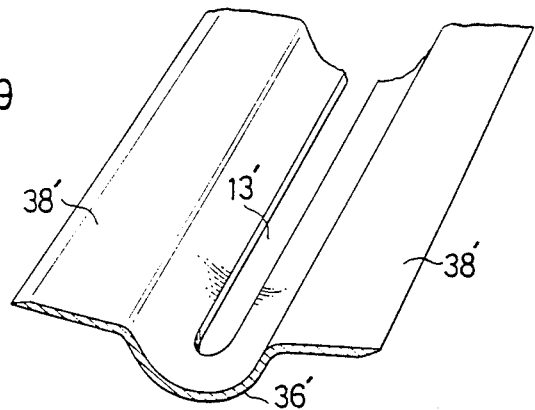
FIG. 20 is a cross-sectional perspective view on an enlarged scale showing the brazing sheet in process of making the header pipe of FIG. 18.

As shown in FIG. 20, the header pipes 3', 4' are respectively provided with bulged portions 36' in which a slit 13' is made for receiving the single tube 1'. The other parts of the heat exchanger are made and assembled in the same manner with the first example described above. Throughout FIGS. 17 to 20 like reference numerals refer to like and corresponding parts. (31' corresponds to 31 and 38' corresponds to 38) Brazing is effected in the same manner. A cooling medium is introduced into the tube 1 through the inlet pipe 5' and discharged through the outlet pipe 6'. The header pipes 3' and 4' are respectively closed by caps 7' and 8', respectively. The caps 7' and 87' are also effective to prevent the seams of the header pipes 3', 4' from becoming separated owing to heat involved in the brazing operation.

As is evident from the foregoing description, the breazeable pipes can be easily produced by rolling the brazing sheet into a cylinder with its opposite ends being butt jointed to form a liquidtight seam. Prior to initiating the rolling the brazing sheet is provided with the bulged portion in which the apertures are made by a press and an external chill placed on the outside of the bulged portion, thereby protecting the brazing sheet against deformation or crush. The apertures are made to precise dimension, and off the seams of the header pipes. Flashes, if any, can be easily trimmed from the inside of the bulged portion.

We claim:

1. A process for producing a heat exchanger or the like, the heat exchanger including a header, fins and tubes whose ends are connected to the header, the process comprising: preparing a brazing sheet which includes a core sheet coated with a brazing substance at least on one surface; forming a bulged portion in the brazing sheet, the bulged portion having a semi-circular cross-section; providing apertures in the bulged portion; rolling the brazing sheet into a cylinder to form a header, the opposite ends of the sheet being butt jointed to each other; providing a tube for each aperture; inserting the end of each tube into the corresponding aperture of the header; placing fins between adjacent tubes so as to fabricate a provisional assembly of the tubes, the fins and the header; and heating the provisional assembly in a brazing furnace to effect a permanent joint among the tubes, the fins and the header.

2. A process for producing brazeable pipes, the process comprising: preparing a brazing sheet which comprises a core sheet coated with a brazing substance at least on one surface, forming a bulged portion of a semicircular cross-section in the brazing sheet, providing apertures in the bulged portion for insertion of tube ends, and rolling the brazing sheet into a cylinder with its opposite ends being butt jointed to each other.

3. A process as defined in claim 2, wherein the apertures are provided in the direction of circumference of the bulged portion.

4. A process as defined in claim 2, wherein the apertures are provided in the direction of the length of the brazing sheet.

5. A process as defined in claim 2, wherein the apertures are produced by means of a press against an external chill placed in contact with the surface of the bulged portion.

6. A process as defined in claim 2, wherein the apertures are produced by means of milling.

7. A process as defined in claim 2, wherein the brazing sheet has its ends slanted so that when the brazing sheet is rolled into a cylinder, the slanted ends coated with a brazing substance are butt jointed complementary to the thickness of the brazing sheet so as to form seams flush with the walls of the the rolled cylinder.

8. A process for producing brazeable pipes, the process comprising: preparing a brazing sheet which comprises a core sheet coated with a brazing substance at least on one surface, forming a bulged portion of a semicircular cross-section in the brazing sheet, providing apertures in the bulged portion for insertion of tube ends, rolling the brazing sheet into a cylinder with its opposite ends being butt jointed to each other, and covering at least one of the open ends of the rolled cylinder with a cap.

* * * * *